(12) United States Patent
Bertocchi

(10) Patent No.: US 9,282,762 B2
(45) Date of Patent: Mar. 15, 2016

(54) PLANT FOR DEAERATING AND HEATING VEGETABLE PRODUCT

(76) Inventor: Alessandro Bertocchi, Parma (IT)

(*) Notice: Subject to any disclaimer, the term of this patent is extended or adjusted under 35 U.S.C. 154(b) by 143 days.

(21) Appl. No.: 14/118,250

(22) PCT Filed: May 16, 2012

(86) PCT No.: PCT/IB2012/052451
§ 371 (c)(1),
(2), (4) Date: Nov. 18, 2013

(87) PCT Pub. No.: WO2012/160483
PCT Pub. Date: Nov. 29, 2012

(65) Prior Publication Data
US 2014/0106045 A1    Apr. 17, 2014

(30) Foreign Application Priority Data
May 18, 2011   (IT) ................ PI2011A0055

(51) Int. Cl.
| | |
|---|---|
| A23N 1/00 | (2006.01) |
| A23B 7/005 | (2006.01) |
| A23L 1/212 | (2006.01) |
| A23L 2/02 | (2006.01) |
| A23L 2/76 | (2006.01) |
| A23N 1/02 | (2006.01) |

(52) U.S. Cl.
CPC ............ *A23N 1/00* (2013.01); *A23B 7/0053* (2013.01); *A23L 1/2128* (2013.01); *A23L 2/02* (2013.01); *A23L 2/76* (2013.01); *A23N 1/02* (2013.01)

(58) Field of Classification Search
CPC ........... A23N 1/00; A23L 1/2128; A23L 2/02
See application file for complete search history.

(56) References Cited

U.S. PATENT DOCUMENTS

| | | | |
|---|---|---|---|
| 2,453,109 | A | 11/1948 | MacDowell et al. |
| 5,993,876 | A | 11/1999 | Bertocchi |
| 2004/0045451 | A1 | 3/2004 | Bertocchi |
| 2004/0265465 | A1 | 12/2004 | Daniels et al. |
| 2007/0184157 | A1 | 8/2007 | Stegmaier |

FOREIGN PATENT DOCUMENTS

| | | |
|---|---|---|
| GB | 686375 A | 1/1953 |
| IT | 1199392 B | 12/1988 |
| IT | 1249363 B | 2/1995 |

OTHER PUBLICATIONS

International Search Report mailed Apr. 16, 2013, corresponding to PCT/IB2012/052451.

*Primary Examiner* — Anthony Weier
(74) *Attorney, Agent, or Firm* — Ladas & Parry LLP

(57) ABSTRACT

A plant for de-aerating and heating a vegetable product has an extraction section in which a vegetable starting product is treated, in order to obtain an extracted vegetable product, or a vegetable juice. The extracted vegetable product is fed to a cold de-aeration section obtaining an extracted vegetable product and de-aerated cold. The plant also has a heating section in which the de-aerated vegetable product is heated from the starting temperature $T_1$ to a final temperature $T_2$, with $T_2 > T_1$, obtaining a heated de-aerated product. The plant also has a storage reservoir of the de-aerated vegetable product.

14 Claims, 5 Drawing Sheets

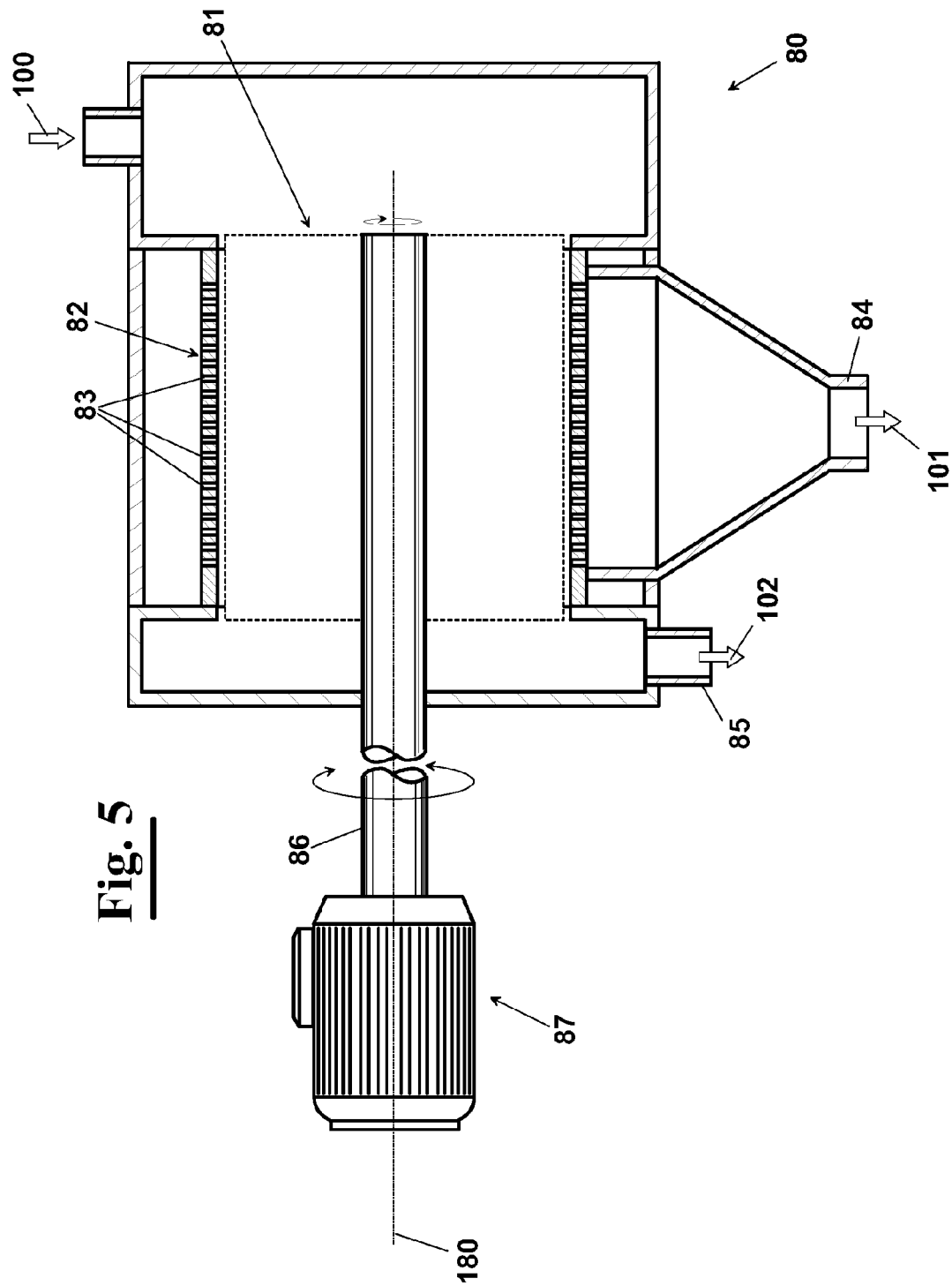

PLANT FOR DEAERATING AND HEATING VEGETABLE PRODUCT

This application is a 371 of PCT/IB2012/052451, filed on May 16, 2012, which claims priority to Italian Application No. PI2011A000055, filed May 18, 2011.

FIELD OF THE INVENTION

The present invention relates to the food industry and, in particular it relates to a process for de-aerating and heating a vegetable product, in particular an extracted vegetable product, such as puree, or juice.

Furthermore, the invention relates to a plant that carries out this process.

DESCRIPTION OF THE PRIOR ART

As well known, a variety exists of types of rotating machines (milling and finishing machines) for extracting juice or puree mainly from vegetable food, fruit and vegetables.

Normally, in a first step, the product to treat is previously softened, or chopped, more or less finely, for being then fed to an extraction machine. The extraction machines of the prior art are essentially made up of a fixed structure that comprises a perforated sheet of cylindrical or conical shape, so called sieve, and a rotor, having a plurality of blades, which rotates inside. The rotor is fitted on a shaft and caused to rotate quickly by a motor. In particular, the chopped or softened product is continuously pushed radially by centrifugal force against the sieve. This way, the liquid part (juice) and/or solid but homogeneous (puree) of the product is filtered through the holes and is conveyed for being then subject to further treatments. The solid fractions that do not pass through the sieve, instead, are carried axially opposite to the inlet and are automatically conveyed to an discharging section where it is discharged (waste). See for example IT1199392.

A known process of this kind is the extraction at room temperature (also-called "cold extraction") that is carried out in two steps: a first step of softening the food pulps through a plurality of pulses in quick succession (see IT1249363) and a second step of separation in the extractor the useful part (juice and puree) from the solid waste fractions. The extraction at room temperature is preferably associated with a quick de-aeration step, always at room temperature (see for example WO02058489). The puree extracted and de-aerated at room temperature is then heated, usually very quickly by an inactivation machine, for blocking the enzymatic activity and stabilizing it. The final product that is obtained with this process has a fresh taste similar to fresh fruit, or to fresh vegetable, and a not brownish colour, due to limited oxidation.

Presently, the systems of heating the product downstream of a step of de-aeration of vegetable puree are of the "hot break" type, or of the type described in EP0850572, designed for causing an enzymatic inactivation, where the puree is caused to recirculate in a loop ensuring that the ducts are completely full of puree, in order to avoid the inlet of air from the outside. In particular, "tube in tube" tubular exchangers can be used, that that carry out the heating with vapour, or superheated water, or different technologies can be used, for example solutions of electric, magnetic type, etc. Many of these systems require a constant flow rate and flow speed in the tubes. This would need use of storage reservoirs of puree associated with pumps that continue pumping the puree machine also when upstream in the extraction line vegetable product is missing, or downstream in the extraction line an interruption of the feeding means occurs.

One of the mostly used systems is the so-called "tube in tube" system used for heating, pasteurizing, or sterilizing the puree. Such system, in the configuration classic, provides a storage reservoir and, downstream, a plurality of heat exchangers with concentric tubes in which, vapour or superheated water, and vegetable puree, separately flow.

When feeding the puree through the machine has to be momentarily stopped, for example because a low temperature of the product is reached, or for problems to the feeding line, or to the extraction apparatus, the puree must in any case continue to circulate at a certain flow rate, in order to avoid that the product remains in contact with the hot surfaces of the exchanger for too a long time, thus suffering from alterations of the taste. Such possibility would lead, in fact, to affect the product cause zone of burning and blackening and, as said, alterations of the taste.

For this reason the known machines provide that, in case of need, the product is sent back to the storage reservoir, located upstream, and from the latter to the heat exchanger loop, in which the puree is caused to recirculate until the normal operation conditions are restored. This causes, however, an overall excessive heating of the product that, in this case, negatively affects the desired final characteristics.

In case of a cold de-aeration machine, the function of the storage reservoir can be carried out by the de-aeration reservoir of same, since it is located in a position useful for executing the recirculation of the puree. However, the hot product entering the de-aeration reservoir having a temperature higher than the evaporation temperature corresponding to the void ratio present in the reservoir, would concentrate the puree and would change, then one of its most important characteristics, i.e. its sugar concentration.

Besides, introducing in the reservoir the hot product before de-aerating at environment pressure, would cause mixing the de-aerated product with the product still to de-aerate, would increase the temperature of the mixture of the two products and would not be possible any more a cold de-aeration without changing the sugar concentration of the product.

Other machines of the prior art are described, for example, in DD136340, WO2007/092565 and in GB686375.

In particular, in DD136340 a de-aeration machine is provided with which a product is obtained completely different from that obtained with a cold de-aeration. In this case the fruit juice at room temperature is, in fact, firstly fed by a first pump to a heat exchanger where it is heated up to a predetermined temperature. Downstream of the heat exchanger, moreover, a de-aerator is provided from which the juice exits heated and de-aerated by suction of a second pump. The latter feeds the heated and de-aerated juice towards a storage reservoir, or towards a point upstream of the first pump. Downstream of the second pump along the recirculation duct, furthermore, another duct is provided for feeding the hot and de-aerated juice to the first pump.

SUMMARY OF THE INVENTION

It is then a feature of the present invention to provide a process for de-aerating and heating a vegetable product, in particular puree, or juice, which in case of need, for example a failure to the feed duct of the vegetable product, or to the extraction apparatus, carries out a temporary recirculation of the product without changing its sugar concentration and without changing the product taste.

It is also a feature of the present invention to provide a process for de-aerating and heating a vegetable product which is easy and cheap with respect to similar processes of the prior art.

It is a further feature of the present invention to provide a process for de-aerating and heating a vegetable product for overcoming the above described drawbacks of the processes of the prior art.

It is, furthermore, a feature of the present invention to provide a plant for de-aerating and heating a vegetable product with the same advantages of said process.

These and other objects are achieved by a plant, according to the invention, for extracting, de-aerating and heating a vegetable product, comprising:
- an extraction section for treating a vegetable starting product, in order to obtain an extracted vegetable product, in particular said extracted vegetable product consisting of a vegetable puree, or a juice;
- a storage reservoir of said extracted vegetable product;
- a cold de-aeration section for de-aerating said extracted vegetable product, obtaining a cold de-aerated extracted vegetable product, said cold de-aeration step being carried out at a temperature T1 less than 35° C.;
- a heating section configured to heat said vegetable product from a starting temperature to a final temperature obtaining a heated vegetable product;

whose main feature is that:
- said cold de-aeration section is located downstream of the extraction section,
- said heating section is located downstream of said cold de-aeration section, said heating section configured to heat said cold de-aerated product from said temperature T1 to a final temperature T2, with T2>T1, obtaining a de-aerated and heated product;
- said storage reservoir is located downstream of said heating section such that in said storage reservoir a predetermined amount of vegetable de-aerated and heated product is present at said temperature T2, and
- a deviation means is provided located downstream of said storage reservoir, said deviation means configured to feed selectively said heated de-aerated product up to an exit section located downstream of said storage reservoir, in particular said outlet section arranged to transfer the heated de-aerated product out of said machine, or to circulate the vegetable heated de-aerated product up to a recirculation point of the machine, said recirculation point located between the cold de-aeration section and said heating section.

In particular, the deviation means is arranged to be selectively switched, or operated, between a first operative configuration, in which the de-aerated and heated product is transferred in said outlet section for being transferred out from the machine, and a second operative configuration, in which the heated de-aerated product is fed to said recirculation point.

In particular, the heating section has an heating means that is arranged to transmit to the de-aerated vegetable product a thermal power suitable for bringing the de-aerated vegetable product from the starting temperature T1, to the final temperature T2, with T2>T1.

In an exemplary embodiment, the deviation means can also be switched, or operated, in a third operative configuration, in which a part of the heated de-aerated product is sent to said outlet section for being transferred out from the machine, and another part of the de-aerated and heated product is fed to said recirculation point of the machine located between the cold de-aeration section and the heating section. This can be for example obtained using modulating valves.

More precisely, in normal working conditions, the deviation means is in the first operative configuration, in which the de-aerated and heated product that exits through the storage reservoir is sent, by a pump, to the outlet section for being transferred out from the machine, for example to an additional treatment section.

In case of need, instead, for example for problems of the extraction line occurred downstream of the storage reservoir, or for a missing, or insufficient, feeding vegetable product to the de-aeration section, the deviation means is switched to the second operative configuration, or to the third operative configuration, in order to have respectively a total recirculation, or partial, of the vegetable heated de-aerated product in the machine. In particular, when the deviation means is switched to the second operative configuration, the heated de-aerated product is caused to recirculate in a closed loop comprising, in series, the heating means and the storage reservoir, until normal operating conditions of the machine are restored.

In particular, in the de-aeration section a de-aeration chamber is arranged in which a predetermined amount of extracted vegetable product is present.

Preferably, a vacuum generation means is provided to generate a predetermined void ratio in the above described de-aeration chamber.

In particular, an adjustment means can be provided arranged to measure instantly the void ratio present in the de-aeration chamber and adjust the vacuum generation means for generating said void ratio in the de-aeration chamber.

In particular, a feeding means is provided the vegetable product to the de-aeration section under a predetermined head. Furthermore, preferably the machine comprises a plurality of ducts that, in use, are provided full of vegetable product. This way, the production is avoided of air bubbles and the attraction of air along all the machine is avoided.

Advantageously, in the de-aeration chamber the pressure is kept between 0.6 and 0.98 bar absolute.

In particular, the heating means can be adapted to heat said de-aerated vegetable product from said temperature T1 to a temperature T2, with 45° C.<T2<90° C.

Advantageously, in the extraction section a rotor is configured to work in combination with a fixed sieve having a plurality of holes, in order to divide a vegetable starting product into a main product comprising said puree, or juice, which crosses said sieve and is discharged from said extraction section through a first outlet, and into a waste material that, instead, cannot cross said sieve and is discharged from said extraction section through a second outlet.

In particular, when the deviation means is switched to the first operative configuration, the three-way valve connects a discharge duct of the storage reservoir with said outlet section for transferring the vegetable de-aerated and heated product out from the machine. Instead, when the deviation means is switched to the second, or to the third, operative configuration, the three-way valve connects the discharge duct of the storage reservoir with said recirculation point.

In particular, the deviation means can comprise a first three-way valve located downstream of said storage reservoir and a second three-way valve located downstream of said de-aeration section.

More precisely, in an exemplary embodiment, the deviation means comprises:
- a first three-way valve located downstream of said storage reservoir and operatively connected to:

a discharge duct of said heated de-aerated product from said storage reservoir, when said deviation means is switched to said first, or to said second, or to said third operative configuration;

an outlet duct for sending said de-aerated and heated product from said storage reservoir to said outlet section for being transferred out from the machine, when said deviation means is switched to said first, or to said third operative configuration;

a recirculation duct which is arranged to feed said de-aerated and heated product to said recirculation point, when said deviation means is switched to the second, or to the third operative configuration;

a second three-way valve arranged at said recirculation point located between said cold de-aeration section and said heating section, said second three-way valve being operatively connected to:

a receiving duct arranged to receive said cold de-aerated product from said de-aeration section;

a feeding duct arranged to feed said cold de-aerated product to said heating section when said deviation means is switched to said first operative configuration, or to feed a mixture of said hot de-aerated product and of said cold de-aerated product to said heating section when said deviation means is switched to said third operative configuration;

said recirculation duct which is arranged to circulate said heated de-aerated product from said first three-way valve to said recirculation point when said deviation means is switched to said second, or to said third operative configuration.

In particular, at least one first pump is provided for transferring the cold de-aerated vegetable product from said cold de-aeration section to said heating section, and at least one second pump for discharging the vegetable heated de-aerated product from the storage reservoir. The first pump can be, furthermore, configured to displace the hot de-aerated product through the heating section.

Preferably, the first and the second pump are vacuum tight pumps. In particular, the first and the second pump work under a predetermined head.

In particular, the heating means can be an enzymatic inactivation means which is adapted to transmit to the de-aerated vegetable product a thermal power that is suitable to cause an enzymatic inactivation, in order to obtain a de-aerated and enzymatically inactivated product.

Advantageously, the heating means perform an exchange of thermal energy between the de-aerated vegetable product and a heating fluid.

In particular, the heating fluid can be vapour, or superheated water, or alternatively, a combination thereof.

In particular, furthermore, a control means can be provided arranged to switch said deviation means to said first, or to said second operative configuration.

Furthermore, the control means can be configured to operate said first and/or said second pump, in order to adjust the flow of said cold de-aerated product and/or the flow of the hot de-aerated product.

In particular, the cold de-aeration section comprises a de-aeration reservoir in pneumatic connection with an air suction system, said de-aeration reservoir having an inlet for feeding the cold vegetable product and an outlet for discharging the cold de-aerated vegetable product. More in detail, to discharge the cold vegetable product a discharge pump is provided in connection with said outlet, said discharge pump arranged to feed said cold de-aerated product towards said heating means.

According to another aspect of the invention, a method for de-aerating and heating an extracted vegetable product, in particular puree, or juice, comprises the steps of:

cold de-aerating an extracted vegetable product in a cold de-aeration section obtaining a vegetable cold de-aerated product, said cold de-aeration step being carried out at a temperature T1 less than 35° C.;

heating said cold de-aerated vegetable product in a heating section, said heating step configured to heat said de-aerated vegetable product from a starting temperature T1 to a final temperature T2, with T2>T1 obtaining a vegetable heated de-aerated product;

introducing said vegetable heated de-aerated product in a storage reservoir, said storage reservoir located downstream of said heating section such that in said storage reservoir a predetermined amount is present of vegetable heated de-aerated product, and a step is provided of selectively feeding said heated de-aerated product to an outlet section located downstream of said storage reservoir for discharging said heated de-aerated product out from the machine, or to a recirculation point located between said cold de-aeration and said heating section.

BRIEF DESCRIPTION OF THE DRAWINGS

The invention will be now shown with the following description of an exemplary embodiment thereof, exemplifying but not limitative, with reference to the attached drawings in which:

FIG. 5 diagrammatically shows a longitudinal sectional view of a possible exemplary embodiment of an extractor used to obtain the extracted vegetable product from food to the machine, according to the invention, for de-aerating and heating an extracted vegetable product.

DETAILED DESCRIPTION OF SOME EXEMPLARY EMBODIMENTS

Figure 1:
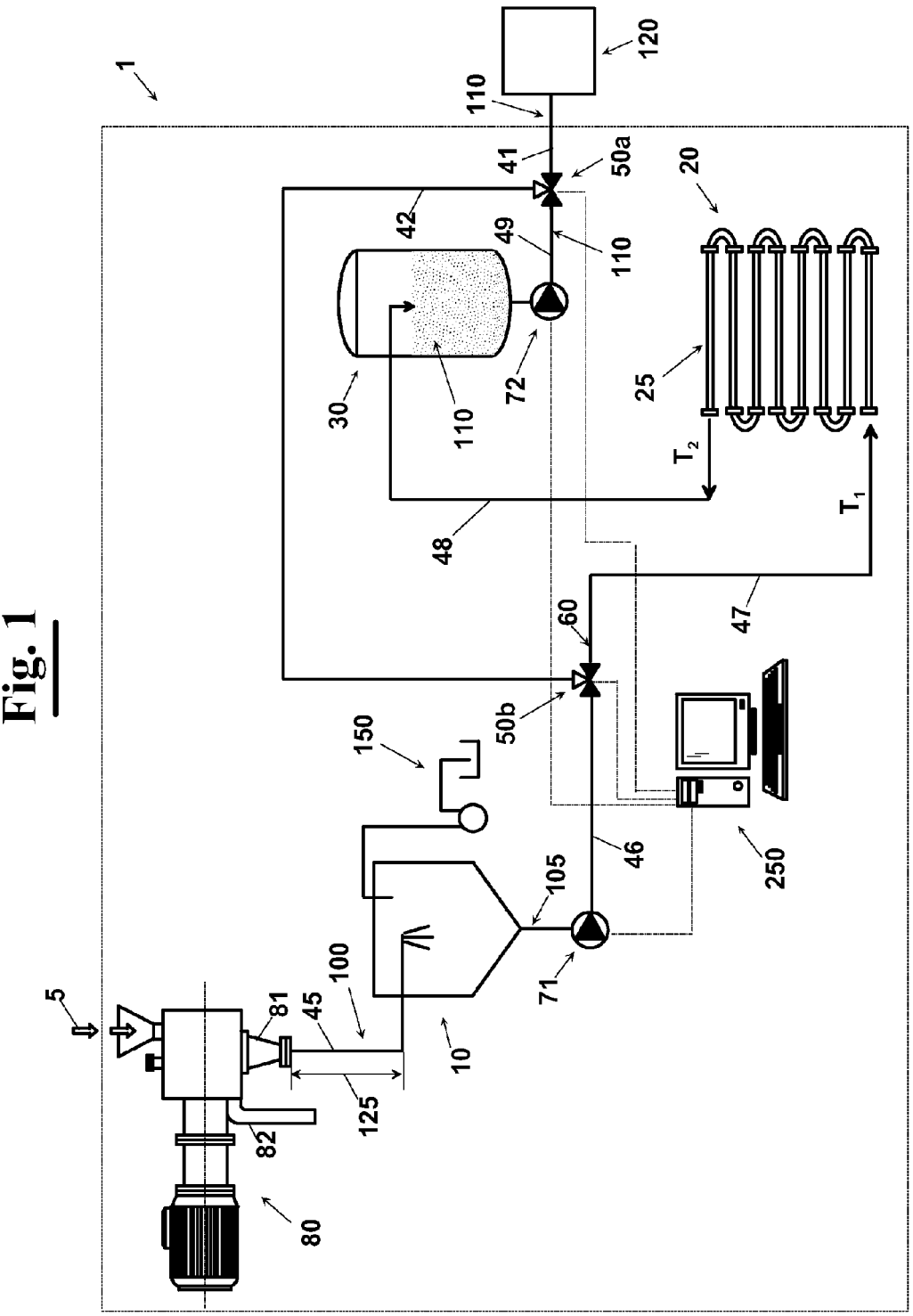
FIG. 1 diagrammatically shows a first exemplary embodiment of the machine, according to the invention, for de-aerating and heating the extracted vegetable product, such as puree, or juice in a first operative configuration.

As diagrammatically shown in FIG. 1, a machine 1, according to the invention, for de-aerating and heating a vegetable product comprises an extraction section 80 in which a vegetable starting product 5 is treated, in order to obtain an extracted vegetable product 100, in particular a puree, or a vegetable juice. The extracted vegetable product 100 is fed to a cold de-aeration section obtaining a cold-extracted and de-aerated vegetable product 105. More precisely, the de-aeration section 30 carries out a step of de-aerating the vegetable product at a temperature T1 less than 35° C., in particular at a temperature set between −5° C. and 35° C.

Machine 1 also comprises a heating section 20 in which a heating means 25 is arranged to transfer a thermal power P to the de-aerated vegetable product 105 in order to heat it from the starting temperature T1 to a final temperature T2, with T2>T1, obtaining a heated de-aerated product 110.

The heating means 25 may comprise, for example, a double tube arranged to heat the de-aerated vegetable product 105 exchanging thermal power between the de-aerated vegetable product 105 and a heating fluid, for example vapour, or super-heated water, or a combination thereof.

Figure 4:
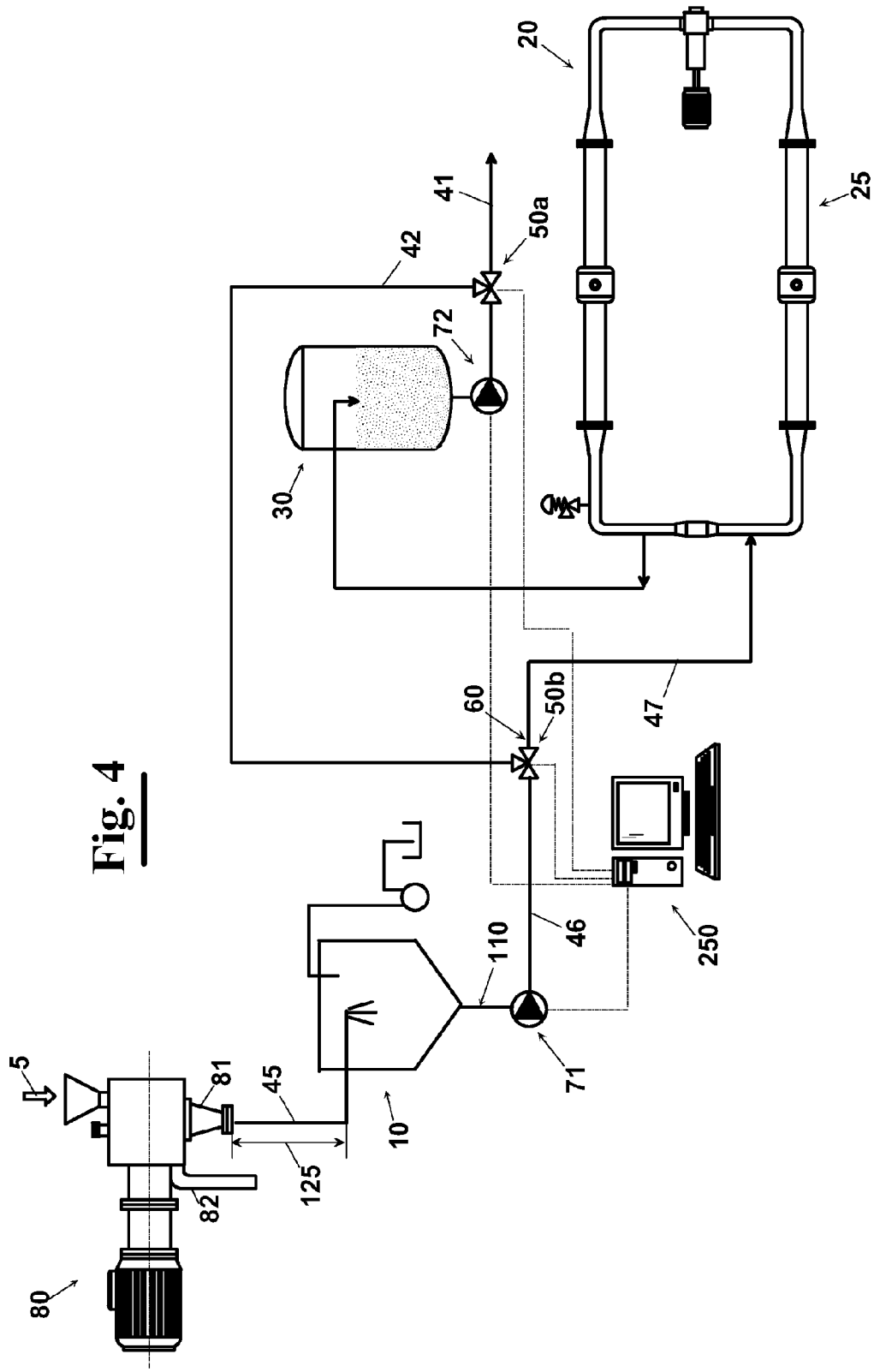
FIG. 4 diagrammatically shows an exemplary embodiment of the machine of FIG. 1.

In an exemplary embodiment of the invention and shown in FIG. 4, the heating means 25 is arranged to transfer to the de-aerated product 105 a thermal power that is suitable to cause an enzymatic inactivation. Therefore, the heated de-aerated product exits from heating section enzymatically inactivated. In this case, the final temperature T2 can be about 85° C.-90° C.

Machine 1 also comprises a storage reservoir 30 of the de-aerated vegetable product. According to the invention, storage reservoir 30 is located downstream of heating section 20, proceeding along the conveying direction of the de-aerated vegetable product through machine 1. Therefore, the de-aerated vegetable product present in storage reservoir 30 is a vegetable de-aerated and heated product 110.

Machine 1 also comprises a deviation means 50 located downstream of storage reservoir 30 and arranged to selectively feed the heated de-aerated product 110 either to an outlet duct 41 or to a recirculation duct 42. More precisely, through outlet duct 41 the heated de-aerated product 110 is sent to an exit section, diagrammatically shown as block 120, for being transferred out from machine 1, for example in a further treatment section not shown in the figures. Instead, through recirculation duct 42, product 110 is fed to a recirculation point 60 of machine 1, which are located upstream of storage reservoir 30 and precisely located between cold de-aeration section 10 and heating section 20. In this case, therefore, product 110 is caused to recirculate in a closed circuit comprising heating section 20 and storage reservoir 30.

Figure 2:
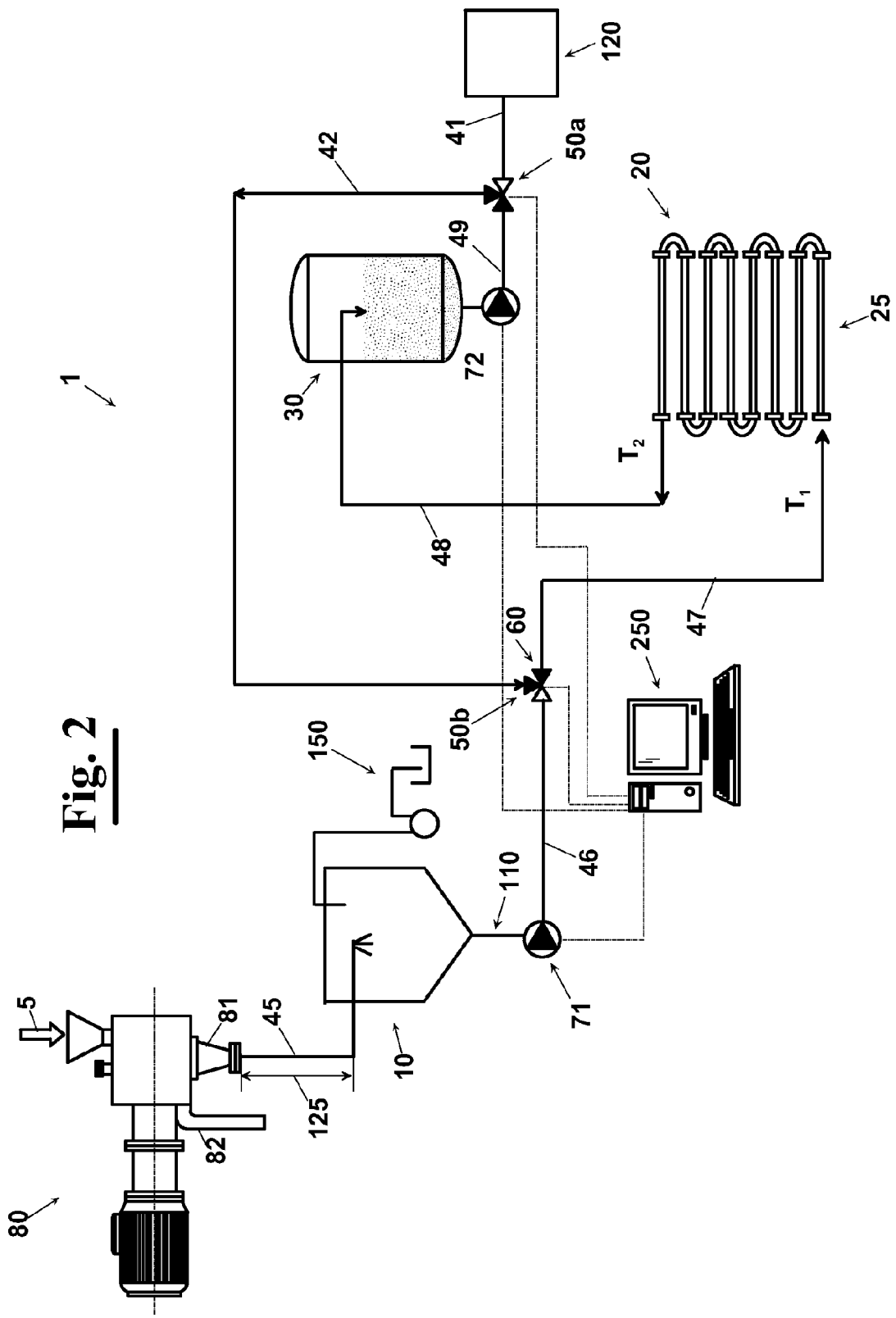
FIG. 2 diagrammatically shows the machine of FIG. 1 for de-aerating and heating the extracted vegetable product, such as puree, or juice in a second operative configuration.

In particular, the deviation means 50, for example a first and a second three-way valve 50a and 50b, can be operated between a first operative configuration (FIG. 1) and at least one second operative configuration (FIG. 2).

More in detail, in the first operative configuration the cold de-aerated product 105 is fed by the de-aeration reservoir 10 to heating section 20 by a receiving duct 46 and a feeding duct 47 in communication with valve 50b. By heating section 20 the de-aerated and heated product is then sent to storage reservoir 30 through a duct 48. The de-aerated and heated product 110 is then discharged from storage reservoir 30 through a discharge duct 49. This is connected to valve 50a which carrying out in the first operative configuration connects the discharge duct 49 with an outlet duct 41 through which the de-aerated and heated product 110 is transferred out from machine 1.

In the second operative configuration, valve 50b insulates the receiving duct 46 by feeding duct 47 and then by the apparatus to it connected whereas valve 50a insulates the discharge duct 49 and recirculation duct 42 from the outlet duct 41. Therefore, in this operative configuration, the heated de-aerated product 110, once discharged from storage reservoir 30 crosses the discharge duct 49, passes through valve 50a and crosses recirculation duct 42 up to arriving at valve 50b. Such, carrying out in the second operative configuration, connects recirculation duct 42 to the feeding duct 47, in order to bring again the de-aerated and heated product to the heating section 25 and then to storage reservoir 30 through duct 48 (FIG. 2).

Figure 3:
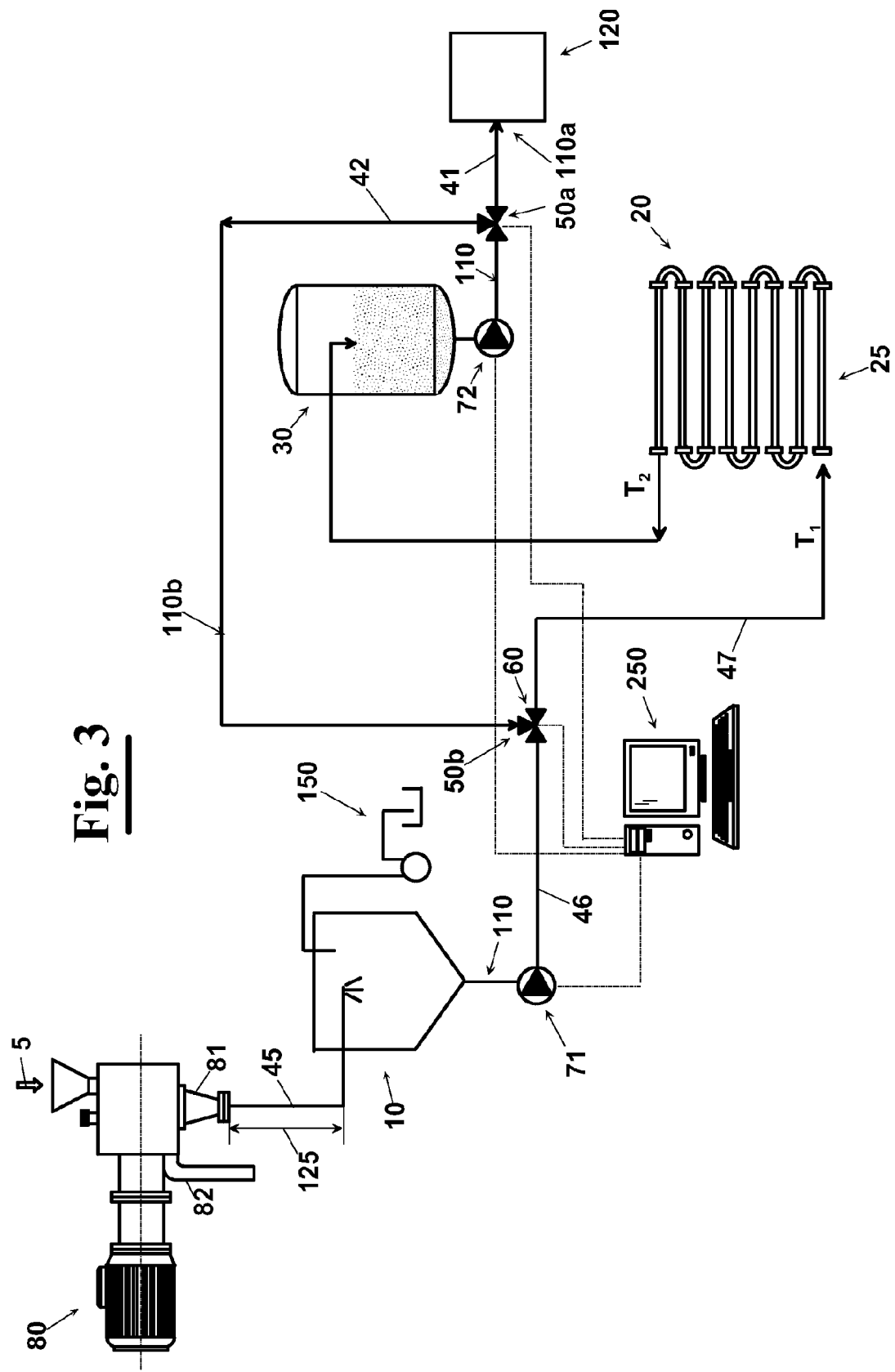
FIG. 3 diagrammatically shows the machine of FIG. 1 for de-aerating and heating the extracted vegetable product, such as puree, or juice in a third operative configuration.

As diagrammatically shown in FIG. 3, in an exemplary embodiment, valves 50a and 50b are configured, furthermore, to work in a third operative configuration, in which a part of heated de-aerated product 110a is discharged from machine 1 through outlet duct 41, and another part of the de-aerated and heated product 110b is recirculated in recirculation duct 42, and from there is sent with a predetermined amount of cold de-aerated product 105 to feeding duct 47 to it connected by valve 50b. Therefore, in this third operative configuration, in feeding duct 47 a mixture of de-aerated and heated product 110b and of cold de-aerated product 105 is present that is recycled to a circuit comprising heating section 20 and storage reservoir 30.

In normal operation (FIG. 1), valves 50a and 50b is in the first operative configuration, to which the de-aerated and heated product 110 that exits through storage reservoir 30 is sent, by a pump 71, in outlet section 120 for being transferred out from machine 1, for example in an additional treatment section, or in a storage section, not shown in the figures.

In case of need, instead, for example for problems in the extraction line occurred downstream of storage reservoir 30, or for a missing, or insufficient, feeding rate of extracted vegetable product 100 to de-aeration section 10, the deviation means 50 are switched to the second operative configuration (FIG. 2), or to the third operative configuration (FIG. 3), to provide respectively a total recirculation, or partial, of the vegetable heated de-aerated product 110 within the circuit comprising heating section 20 and storage reservoir 30. When then normal operating conditions of machine 1 are restored, valves 50a and 50b are operated, in order to work in the first operative configuration.

The step of conveying the de-aerated vegetable product 105 from de-aeration section 10 to heating section 20 and after storage reservoir 30, is carried out by a pump 71, whereas the step of conveying the heated de-aerated product 110 from storage reservoir 30 to outlet section 120 and/or to recirculation point 60 is made through a pump 72.

In a preferred exemplary embodiment, in extraction section 80 located upstream of cold de-aeration section 10 a rotor 81 is configured to work in combination with a fixed sieve 82 having a plurality of holes 83. More precisely, rotor 81 is moved by a shaft 86 operatively connected to a motor 87 in order to cause a rotation about an axis 180. This way, rotor 81 forces the vegetable product 100 against the sieve 82 obtaining a separation into an extracted vegetable product 101, comprising the puree, or the juice, which crosses holes 83 of sieve 82 and is discharged from extraction section 80 through a first outlet 84, and into a waste material 102 that, instead, cannot cross sieve 82 and is discharged from extraction section 80 through a second outlet 85. The extracted product 100 is then sent through a duct 45 from first outlet 84 to de-aeration section 10.

In de-aeration section 10 a de-aeration chamber 15 is provided into which the extracted vegetable product 100 is fed.

As shown in FIGS. 1 to 4, the extracted vegetable product 100 can be fed to de-aeration section 10 directly from extraction section 80, maintaining a certain head 125 in the feeding duct 45. To avoid the production of air bubbles and avoid the attraction of air, the ducts of machine 1 are kept always full of vegetable product.

The de-aeration chamber 10 is in pneumatic connection with a means 150 for generating a predetermined void ratio, for example a vacuum pump. In particular, an adjustment means can be provided, not shown in the figures, arranged to measure instantly the void ratio present in de-aeration reservoir 10 and to adjust the means 150.

Furthermore, a control means can be provided 250 electrically connected with the deviation means 50, for example with valves 50a and 50b, to switch them to the first, or to the second, or to the third operative configuration. The control means 250 can also operate the pumps 71 and 72, in order to adjust the flow of the cold de-aerated product 105 and/or the flow of the hot de-aerated product 110.

The foregoing description of specific exemplary embodiments will so fully reveal the invention according to the conceptual point of view, so that others, by applying current knowledge, will be able to modify and/or adapt in various applications the specific exemplary embodiments without further research and without parting from the invention, and, accordingly, it is meant that such adaptations and modifications will have to be considered as equivalent to the specific embodiments. The means and the materials to realise the different functions described herein could have a different nature without, for this reason, departing from the field of the invention. It is to be understood that the phraseology or terminology that is employed herein is for the purpose of description and not of limitation.

The invention claimed is:

1. A plant for extracting, de-aerating and heating a vegetable product comprising:
    an extraction section for treating a vegetable starting product, in order to obtain an extracted vegetable product;
    a storage reservoir of said extracted vegetable product;
    a cold de-aeration section for de-aerating said extracted vegetable product obtaining a cold de-aerated extracted vegetable product, said cold de-aeration step being carried out at a temperature T1 less than 35° C.;
    a heating section arranged to heat said vegetable product from a starting temperature to a final temperature, obtaining a heated product;
    wherein said cold de-aeration section is located downstream of said extraction section;
    wherein said heating section is located downstream of said cold de-aeration section, said heating section arranged to heat said cold de-aerated product from said temperature T1 to a final temperature T2, with T2>T1, obtaining a de-aerated and heated product;
    wherein said storage reservoir is located downstream of said heating section such that in said storage reservoir a predetermined amount of vegetable de-aerated and heated product is present at said temperature T2, and
    wherein a deviation means is provided located downstream of said storage reservoir, said deviation means arranged to feed selectively said heated de-aerated product to an exit section located downstream of said storage reservoir, or to a recirculation point located between said cold de-aeration section and said heating section, such that when needed a temporary recirculation can be carried out of said product without changing its sugar concentration and without changing the product taste.

2. The plant according to claim 1, wherein said deviation means is configured to be operated in a first operative configuration, in which said de-aerated and heated product is sent to said outlet section located downstream of said storage reservoir for being transferred out from the plant, or in a second operative configuration, in which said heated de-aerated product is fed to said recirculation point, in such a way that, in normal working conditions, said deviation means is in said first operative configuration, whereas when needed said deviation means is in said second operative configuration.

3. The plant according to claim 1, wherein said deviation means, is configured to work in a third operative configuration, in which a part of said heated de-aerated product is fed to said outlet section and another part of said de-aerated and heated product is fed to said recirculation point.

4. The plant according to claim 1, wherein in said cold de-aeration section a de-aeration chamber is provided working at a pressure set between 0.6 and 0.98 bar absolute.

5. The plant according to claim 1, wherein a vacuum generation means is provided to generate a predetermined void ratio in said de-aeration chamber.

6. The plant according to claim 1, wherein an adjustment means is provided arranged to measure instantly the void ratio present in said de-aeration chamber and to adjust said vacuum generation means for generating said void ratio in said de-aeration chamber.

7. The plant according to claim 1, wherein a feeding means is provided to feed said vegetable product to said de-aeration section under a predetermined head and a plurality of ducts are provided that, in use, are full of vegetable product, to avoid the production of air bubbles and to block the attraction of air along said plant.

8. The plant according to claim 1, wherein said heating means is arranged to heat said de-aerated vegetable product from said temperature T1 to said temperature T2, where 45° C.<T2<90° C.

9. The plant according to claim 1, wherein in said extraction section a rotor is configured to work in combination with a fixed sieve having a plurality of holes, in order to divide a vegetable starting product into a main product comprising said puree, or juice, which crosses said sieve and is discharged from said extraction section through a first outlet, and into a waste material that, instead, cannot cross said sieve and is discharged from said extraction section through a second outlet, said main product being sent to said cold de-aeration section through said first outlet.

10. The plant according to claim 1, wherein a feeding means is provided to feed said extracted vegetable product to said de-aeration section under a predetermined head.

11. The plant according to claim 2, wherein said deviation means comprises:
    a first three-way valve located downstream of said storage reservoir and operatively connected to:
        a discharge duct of said heated de-aerated product from said storage reservoir, when said deviation means is switched to said first, or to said second, or to said third operative configuration;
        an outlet duct for sending said de-aerated and heated product from said storage reservoir to said outlet section for being transferred out from the plant, when said deviation means is switched to said first, or to said third operative configuration;
        a recirculation duct arranged to feed said de-aerated and heated product to said recirculation point, when said deviation means is switched to said second, or third operative configuration;
    a second three-way valve arranged at said recirculation point between said cold de-aeration section and said heating section, said second three-way valve being operatively connected to:
        a receiving duct, arranged to receive said cold de-aerated product from said de-aeration section;
        a feeding duct, arranged to feed said cold de-aerated product to said heating section when said deviation means is switched to said first operative configuration, or to feed a mixture of said hot de-aerated product and of said cold de-aerated product to said heating section when said deviation means is switched to said third operative configuration;
        said recirculation duct arranged to circulate said heated de-aerated product from said first three-way valve to said recirculation point when said deviation means is switched to said second, or to said third operative configuration.

12. The plant according to claim 1, comprising at least one first pump for transferring said cold de-aerated vegetable product from said cold de-aeration section to said heating section, and at least one second pump for discharging said vegetable heated de-aerated product from said storage reservoir, wherein said first and said second pumps work under a head.

13. The plant according to claim 1, wherein in said heating section a heating means is provided arranged to transmit to said cold de-aerated vegetable product a thermal power that is suitable to cause an enzymatic inactivation obtaining an enzymatically inactivated hot de-aerated product.

14. The plant according to claim 2, wherein a control means is further provided arranged to switch said deviation means to said first, or to said second, or to said third operative configuration.

\* \* \* \* \*